United States Patent [19]

Sumikama et al.

[11] 3,765,238

[45] Oct. 16, 1973

[54] HEAT FLOW METER

[75] Inventors: Sadao Sumikama, Yokohama; Kazuhiro Osato, Kawasaki; Jiro Nishimura, Yokohama, all of Japan

[73] Assignee: Showa Denko K. K., Minato-ku, Tokyo, Japan

[22] Filed: Dec. 29, 1970

[21] Appl. No.: 102,290

[52] U.S. Cl. ............................................. 73/190 H
[51] Int. Cl. ......................................... G01k 17/00
[58] Field of Search ................... 73/15 R, 15 A, 190

[56] References Cited
UNITED STATES PATENTS

| | | | |
|---|---|---|---|
| 2,484,736 | 10/1949 | Razek | 73/15 |
| 3,075,377 | 1/1963 | Lang | 73/15 |
| 2,493,651 | 1/1950 | Boelter et al. | 136/226 |
| 3,459,945 | 8/1969 | Astheimer et al. | 73/190 X |
| 3,131,304 | 4/1964 | Hager, Jr. | 250/83.3 |

FOREIGN PATENTS OR APPLICATIONS

| | | | |
|---|---|---|---|
| 587,996 | 5/1947 | Great Britain | 73/15 |

*Primary Examiner*—Richard C. Queisser
*Assistant Examiner*—Herbert Goldstein
*Attorney*—Kemon, Palmer & Estabrook

[57] ABSTRACT

A heat flow meter comprising forming a heat flow measuring portion by providing one or plural pairs of mutually connected differential thermocouples on two faces of a thermal resistant plate to measure the heat flow passing through said thermal resistant plate, and providing on said heat flow measuring portion a covering portion composed by a thin heat resisting plate, metallic film, black or gray film and a protective film.

4 Claims, 10 Drawing Figures

HEAT FLOW METER

This invention relates to a heat flow meter for measuring the heat flow passing through the surface or the inside of a body or the inside of a powdery body.

In recent years, it is strongly demanded with the progress of technology to measure heat flow accurately and quickly for the purpose of thermal analysis of various na so that technological development may be achieved with more convenience. The fact, however, is that the study and development of a heat flow meter, highly reliable and capable of measuring heat flow quickly, has generally been neglected.

For instance, the measurement of heat flow is attempted by applying a principle that, when heat flow passes through a body of known thermal conductivity, there is produced a temperature difference between the two faces of the body corresponding to the heat flow and this makes possible the measurement of heat flow. However, when the measuring portion of an instrument is placed on in contact with a measured body for measurement of heat flow in this case, thermal turbulence occurs on the measured body and widely changes the thermal condition of the surrounding, making impossible accurate measurement of the heat flow of the measured body. Further, it is technically difficult because of the heat accumulation in the measured body to obtain a quickly responsible instrument, and hitherto attempted instruments can not be used for measurement at temperatures above 100°C for the reason of material.

This invention is made, in view of the abovementioned fact, with the object of providing a heat flow meter, highly reliable and capable of measuring the heat flow quickly, characterized by comprising a heat flow measuring portion provided with a thermal resistant plate and at least one pair of mutually connected temperature measuring bodies arranged on both two faces of said thermal resistant plate for measuring the heat flow passing through said thermal resistant plate, and covering portion provided with a thermally equalizing layer for equalizing the heat flow passing through the thermal resistant plate and a radiation heat controlling layer for controlling the radiation heat from the outside, and disposed on said heat flow measuring portion.

A heat flow meter according to this invention is excellent in its characteristic compared to conventional ones, and contributes much to various fields of industry.

The present invention can be more fully understood from the following detailed description when taken in connection with reference to the accompanying drawings, in which.

This invention is based on the principle that a heat flow is determined by measuring the temperature difference perpendicular to the heat current in a thermal resistant plate placed on the surface of a body or inside a powdery body when a heat flow passing through the surface of a body or the inside of a powdery body is to be measured.

Figure 1:
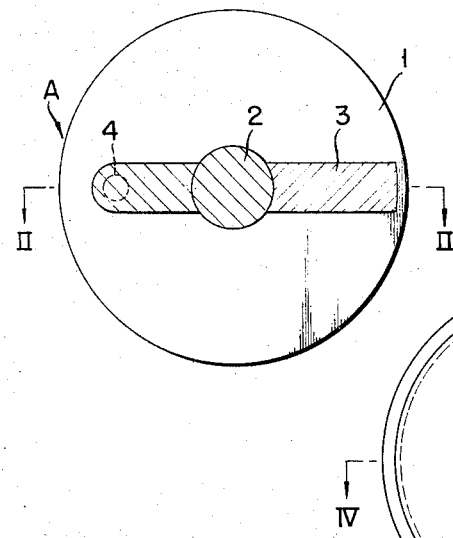
FIG. 1 is a plan view showing an embodiment of a heat flow measuring portion of a heat flow meter according to this invention.
Figure 3:
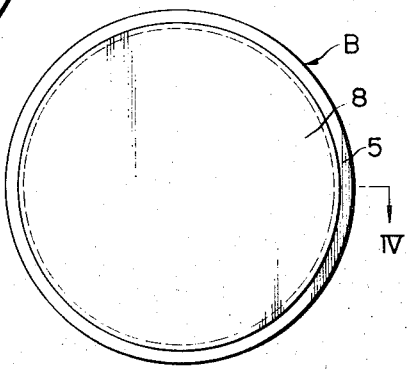
FIG. 3 is a plan view showing an example of the heat flow meter according to this invention.
Figure 2:
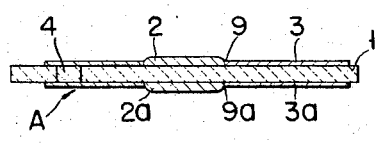
FIG. 2 is a cross-sectional view on line II—II of FIG. 1.
Figure 4:
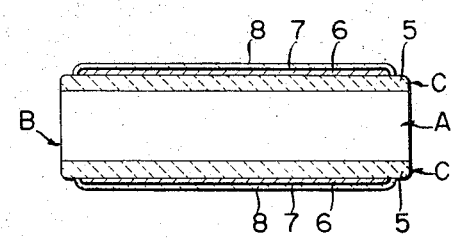
FIG. 4 is a cross-sectional view on line IV—IV of FIG. 3.
Figure 5:
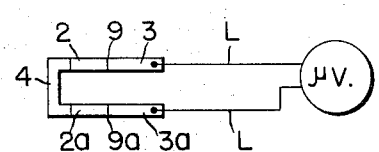
FIG. 5 is an explanatory diagram illustrating the circuit connection of the heat flow measuring portion shown in FIGS. 1 and 2.

Example of this invention composed on this principle will be explained referring to the drawing. FIGS. 1 and 2 show an embodiment of the heat flow measuring portion of a heat flow meter of this invention. One or plural pairs of filmy differential thermocouples consisting of parts 2, 3 and 2a, 3a (2, 2a and 3, 3a are respectively of the same metal) are arranged as temperature measuring bodies on both faces of a thin thermal resistant plate 1 having an arbitrary shape (a circular plate shown in the figure), and a metallic connecting fixture 4 made of the same material with 2, 2a connecting the thermocouples on the two faces to form a heat flow measuring portion A. The differential thermometer may be used as the temperature measuring body in place of the differential thermocouple. Subsequently, as shown in FIGS. 3 and 4, a thin heat resisting and insulating plate 5 is placed on both surfaces of the heat flow measuring portion A, a thermally equalizing layer of metal film 6 is formed on said heat resisting and insulating plates 5, a radiation controlling layer of a colored film 7 is then formed on the metal films 6, and further said thin plate 5, metal film 6, and colored film 7 are covered by a protective film 8 as required. Thus providing a covering portion C over the heat flow measuring portion A, a heat flow meter B according to this invention is obtained. To measure a heat flow with thus obtained heat flow meter, this heat flow meter is placed in contact with a measured body to determine the heat flow by the thermoelectromotive force produced by the temperature difference between the two surfaces of the thermal resistant plate of the heat flow measuring portion of said heat flow meter. That is, the thermoelectromotive force produced by the temperature difference between the joints 9 and 9a of the thermocouple located on both faces of the thermal resistant plate 1 as shown in FIGS. 2 and 5, is measured with a voltmeter $\mu V$ in the unit of microvolt to determine the heat flow. The symbol L in FIG. 5 denotes a lead wire.

In the heat flow meter shown above, the thermal resistant plate 1 is formed of a heat resisting inorganic material such as mica and quarts, and the thickness of 10 to 500 microns is practical. The thermal resistant plate may also be made of a plate of metals (for instance, tantalum, aluminum, etc.) insulated by oxide film formed by anodic oxidation.

The material used for a thermocouple is selected properly from known materials. In the thermocouple shown in FIGS. 1 and 2, 2 and 2a are made of constantan 3 and 3a copper; both are formed in a film by vacuum evaporation.

The material for the heat resisting and insulating thin plate 5 is similar to that for the thermal resistant plate 1. The metal film 6 is provided as a thermally equalizing layer for equalizing the heat flow passing through the heat resistant plate, and a good heat conducting material such as silver, copper, and aluminum, is used for it. This metal film is formed by means of vacuum plating or metal plating.

The colored film is provided as a radiant heat controlling layer so that the absorption and dispersion of the radiand heat from or to the outside can be controlled according to the purpose, and is so formed as to have a desired blackness. For instance, the black film with emissivity of 1 such as vacuum plated carbon film is preferable for a colored film 7 on the side facing the measured body. Use of gray film is also preferable for a colored film. In the example shown in FIG. 4, on both faces of the heat flow measuring portion A is provided the cover portion C comprising 4 layers of a thin heat insulating plate, a metal film, a colored film and a protection film. However, in case that the influence of the radiant heat from the outside is small, the cover portion C may be provided only over the face of the heat flow measuring portion A, opposite to the measured body. In case that the influence of the radiant heat is great, the covering portion C must be provided, as shown in FIG. 4, on both faces of the heat flow measuring portion A to reduce the influence of radiant heat not only from the measured body but also from the outside. For this reason, it is necessary for the betterment of accuracy of the heat flow meter to form a colored film 7 of the cover portion C, selecting a material having a blackness suitable to the radiant heat and applying such materials to the colored film. The protective film 8 is formed of silicon monoxide (SiO), silicon dioxide ($SiO_2$), etc.

Figure 6:
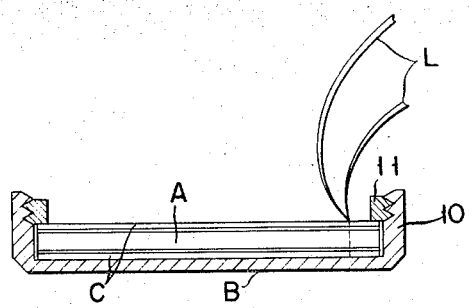
FIG. 6 is an assembling drawing in case that the heat flow meter shown in FIGS. 3 and 4 is set up with the aid of a metallic dished casing.

FIG. 6 shows a heat flow meter B of this invention, assembled into one body with the aid of an outside metallic dished casing 10 and an inside ring 11 for convenience of handling.

Figure 7:
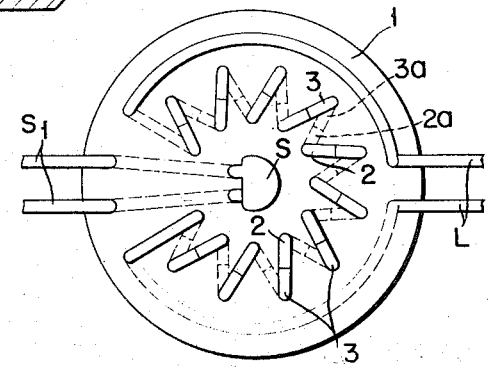
FIG. 7 is a plan view for explaining another embodiment of the heat flow measuring portion of a heat flow meter according to this invention.

FIG. 7 shows a heat flow measuring portion composed by disposing 10 pairs of differential thermocouples on both faces of the thermal resistant plate 1. The sensibility of so composed thermocouples is ten times that of one pair of thermocouples, and the thermoelectromotive force thereof can be measured in the unit of millivolt. Fig. 7 shows an embodiment of a combined thermometer and the symbol S indicates a metal plate for a thermometer, $S_1$ a lead wire for the thermometer. The reason of combining a thermometer is as follows: The thermal characteristic somewhat varies with the measured temperature depending on the difference between the thermocouples or the thermal resistant plate, and the sensibility of the heat flow meter accordingly varies sometimes to some extent. In this case, the compensation of the heat flow meter for the operating temperature is made by measuring the temperature of the thermal resistant plate with a thermometer combined with the heat flow meter. In the heat flow meter shown in FIGS. 3 and 4, both the heat-resisting and insulating thin plate and differential thermocouple are very thin and small in size. Therefore, this type is sensible to heat and causes very few thermal turbulences to the measured body. In addition, its accuracy is high and its response time in measurements is very short. (It is easy for the meter to indicate a constant value in less than one tenth second, depending upon the manufacturing accuracy and the thickness of the heat flow meter body. It is therefore possible to measure not only a constant heat flow but also a transitional change in heat flow as time varies. This meter can thus contribute much to studies in thermodynamics in such fields as furnaces, chemical engineering, mechanical engineering, etc. Furthermore, it has a wealth of practical application. For example, it can be used as a surface thermometer by changing the connection system in its heat flow measuring portion.

Since the heat flow measuring portion is covered with the covering portion consisting of multilayer, it is possible to increase the thermal uniformity and to suitably adjust the absorption and dispersion of radiant heat corresponding to the measured surface, particularly to obtain measured values of high accuracy and reliability. Furthermore, this covering portion serves to protect the heat flow measuring portion in measurements.

Figure 8:
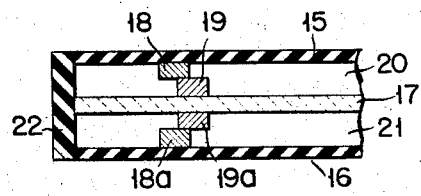
FIG. 8 is a schematic drawing showing a part of still another embodiment of a heat flow measuring portion of a heat flow meter according to this invention.
Figure 9:
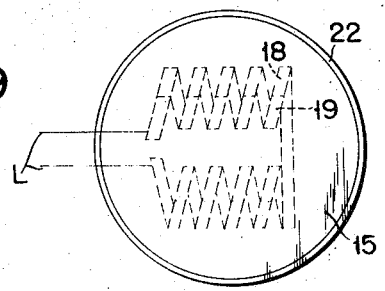
FIG. 9 is a plan view of the heat flow measuring portion shown in FIG. 8.

FIGS. 8 and 9 show a heat flow measuring portion with sensibility higher than those described above. In FIG. 8, the numerals 15 and 16 designate an electrically insulating thin plate. 17 denotes a thermal resistant plate made of mica, for example. 18, 18a, 19, 19a indicate thermocouple elements. As materials of those elements, 18 and 18a are alumel and 19 and 19a are chromel. 20 and 21 represent air layers disposed around the differential thermocouples. 22 designates a stationary ring for supporting the electrically insulating thin plates 15 and 16, the thermal resistant plate 17 and the thermocouples 18, 19, 18a and 19a. FIG. 9 indicates the connection of the thermocouples. In this figure, L denotes a lead wire connected to a voltmeter (not shown).

Figure 10:
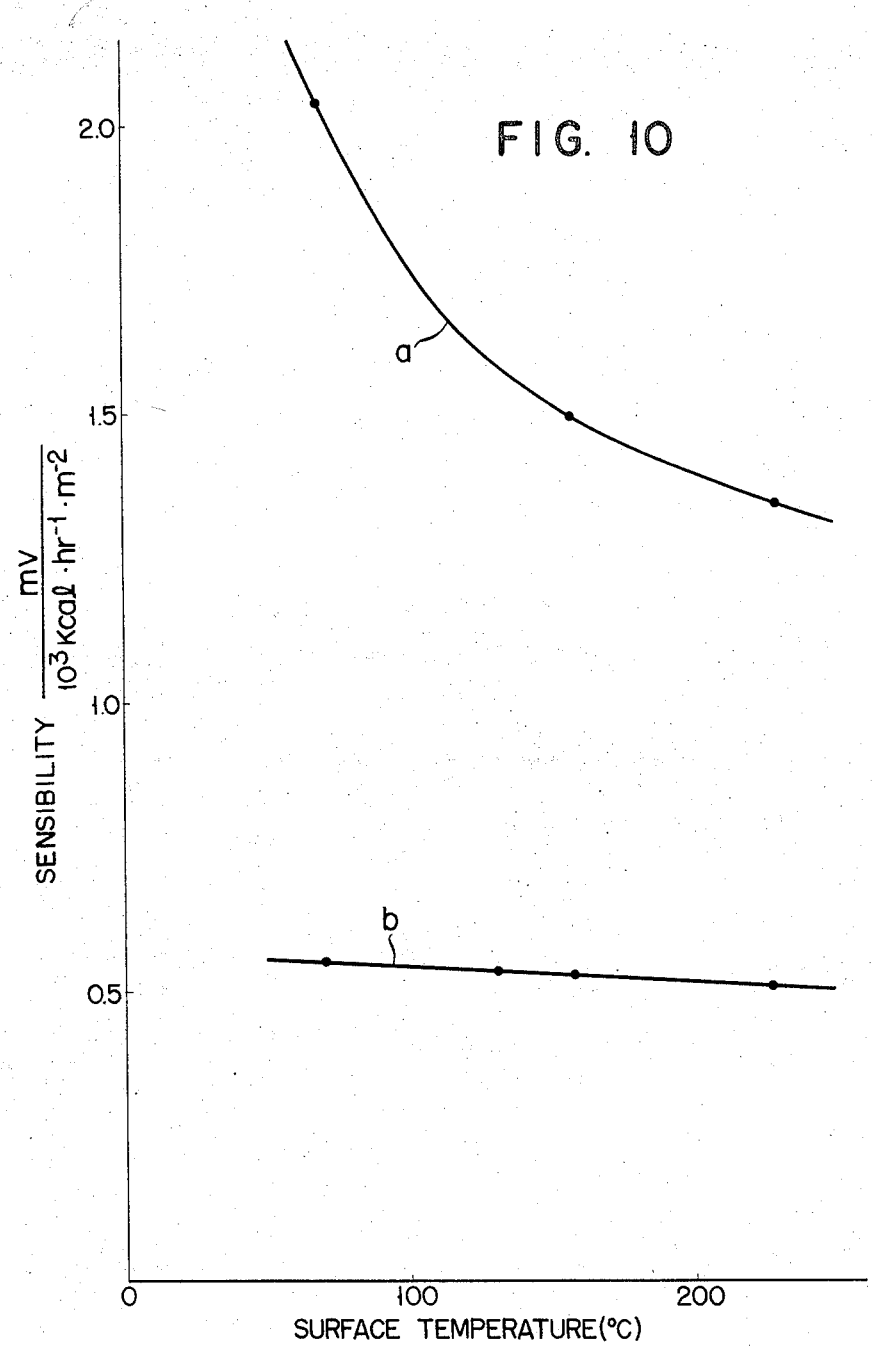
FIG. 10 is a diagram showing the measurement result of the sensibility of a heat flow meter provided with the heat flow measuring portion shown in FIGS. 8 and 9.

The heat flow meter with the heat flow measuring portion so constructed contains the air layer of high heat resistance around the differential thermocouples, resulting in a thermoelectromotive force larger in comparison with the thermal resistant plate, for example, made of mica alone and thus in higher sensibility of the heat flow meter. It should be noted that, with thermocouple elements 18 and 18a thin and 19 and 19a thick, this meter can produce a higher sensibility. The air layers 20 and 21 disposed between the thermal resistant plate 17 and the electrically insulating thin plates 15 and 16, respectively, serve not only to stabilize the spacings therebetween but also to preserve the excellent strength of the heat flow meter by means of the numerous thermopiles. As an example of heat flow meter with the air layers in the heat flow measuring portion, sensibility measurement was made of a heat flow meter with two electrically insulating thin plates 15 (80 microns thick) and 16 (65 microns thick), a thermal resistant plate 17 (100 microns thick), and two air layers 20 and 21 (each 130 microns thick). The result is shown by the curve a in FIG. 10. Note that FIG. 10 indicates the relationship between the surface temperature, °C (axis of abscissa) and the sensibility mV ($10^3$ Kcal·$hr^{-1}$·$m^{-2}$) (axis of ordinate).

For reference only another sensibility measurement was made of a heat flow meter filling up the air layers 20 and 21 with mica. The result is shown by the line b in FIG. 10. A comparison of curve a and line b clearly shows that sensibility can be improved by disposing the air layers in the heat flow measuring portion. Numerically, the sensibility of the heat flow meter was about four times that of the heat flow meter without any layer. The heat flow meter with the air layers is particularly adapted for its use requiring high-sensibility measurement.

What we claim is:

1. A heat flow meter comprising:
   A. A heat flow measuring portion including,
      a. a thermally resistant plate,
      b. a pair of air layers one on each side of and overlying said thermally resistant plate;
      c. at least one pair of mutually connected temperature measuring bodies arranged on opposite faces of said plate for measuring heat flow passing therethrough by Measuring Temperature at points spaced from said plate and within said air Layer,
   B. A covering portion surrounding and overlying said measuring portion including,
      d. a thermally equalizing layer for equalizing the heat passing through said plate, and
      e. a radiation heat controlling layer for controlling the radiation of heat to said measuring portion from outside of said covering portion.

2. A heat flow meter as claimed in claim 1 wherein said covering portion consists of a metallic film of good heat conduction as a thermally equalizing layer and a colored film as a radiation heat controlling layer and having a degree of blackness which corresponds to that of the measured surface.

3. A heat flow meter as claimed in claim 1 wherein said temperature measuring bodies are differential thermocouples.

4. A heat flow meter as claimed in claim 1 wherein said temperature measuring bodies are differential thermometers.

* * * * *